April 14, 1925.  1,533,794

G. FAILLA

PROCESS AND APPARATUS FOR COLLECTING RADIUM EMANATION

Filed Sept. 20, 1920  2 Sheets-Sheet 1

Inventor
Gioacchino Failla
By his Attorneys
Edwards, Sager & Bower

Patented Apr. 14, 1925.

1,533,794

UNITED STATES PATENT OFFICE.

GIOACCHINO FAILLA, OF NEW YORK, N. Y.

PROCESS AND APPARATUS FOR COLLECTING RADIUM EMANATION.

Application filed September 20, 1920. Serial No. 411,582.

*To all whom it may concern:*

Be it known that I, GIOACCHINO FAILLA, a citizen of the United States, residing at New York, in the county of New York and State of New York, have invented certain new and useful Improvements in Processes and Apparatus for Collecting Radium Emanation, of which the following is a specification.

This invention relates to the utilization of radium emanation and particularly to a method and apparatus for providing the emanation in a manner that is simple, safe and expeditious in manipulation and convenient in use.

Radium emanation is a gas given off by radium and its salts due to the breaking down of the radium atom. This gas itself in turn breaks down into solid substances and it and its products are radioactive. This radioactivity is used in various ways and particularly in the treatment of cancerous growths either by subjecting the affected tissue to the rays of the radium product in containers applied near the parts to be treated, or by direct injection of a solution of the radio-active substance.

The emanation deteriorates with time and in practice must be used within a few days after it is evolved from the radium so that it is usual to make daily collections of the emanation for use at the proper intervals. This daily amount is extremely minute being less than one ten millionth of an ounce from a radium source of eight ounces costing about one million dollars, so that it is important to handle it with extreme care. The radiation from the emanation is, under certain circumstances, injurious to living tissue causing severe burns and it is desirable that the collection method and apparatus be such as not to subject the operator to prolonged exposure to the emanation rays.

The method and apparatus of this invention only require very brief attention of the operator at long intervals and the collection of the accumulated emanation may be accomplished by the operator with the utmost exactitude and while safely shielded from the injurious rays.

Figure 1:
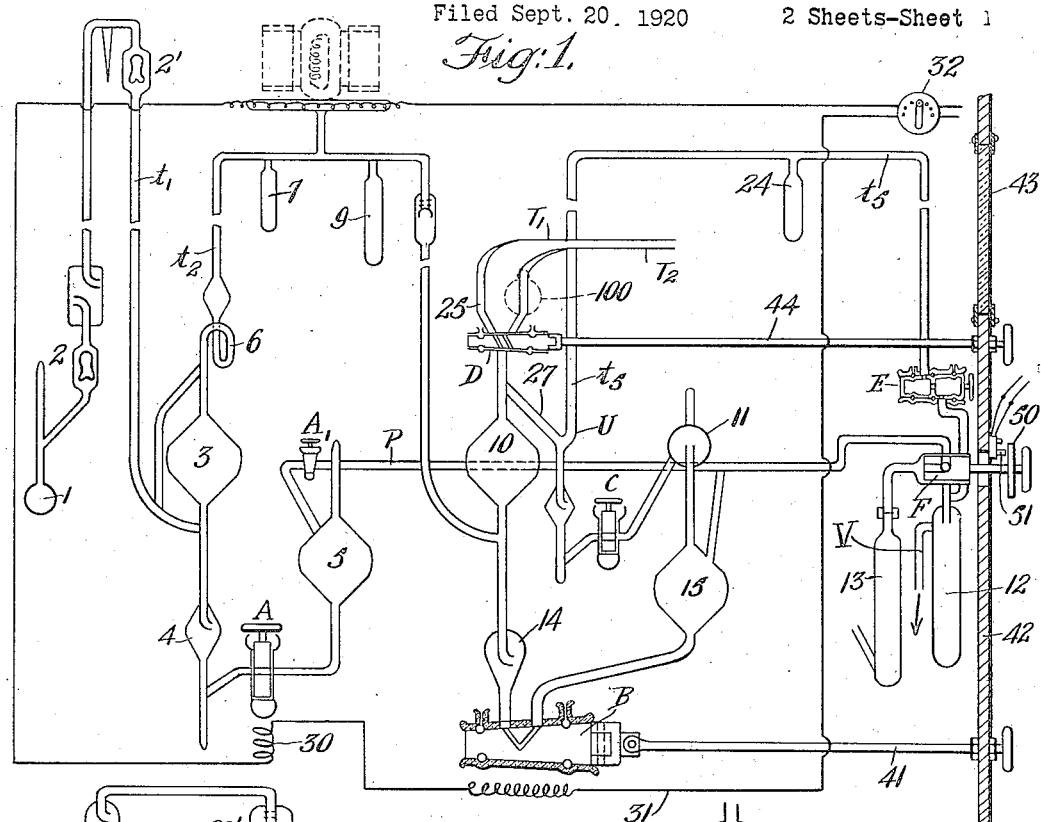
Figure 2:
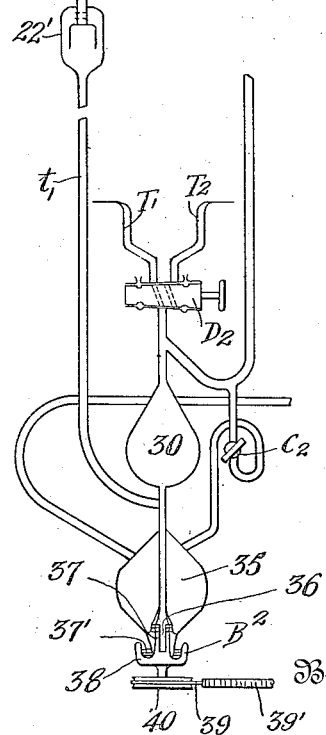
Figure 3:
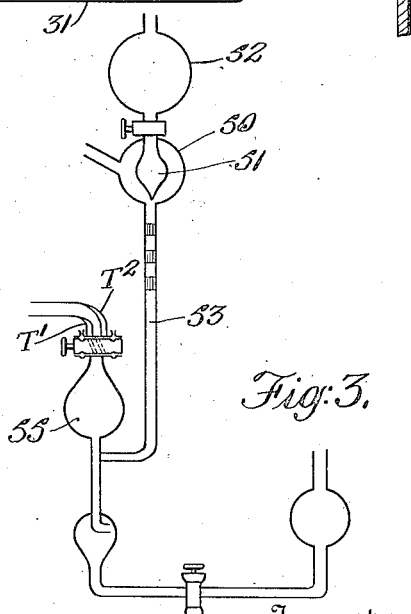
Figure 4:
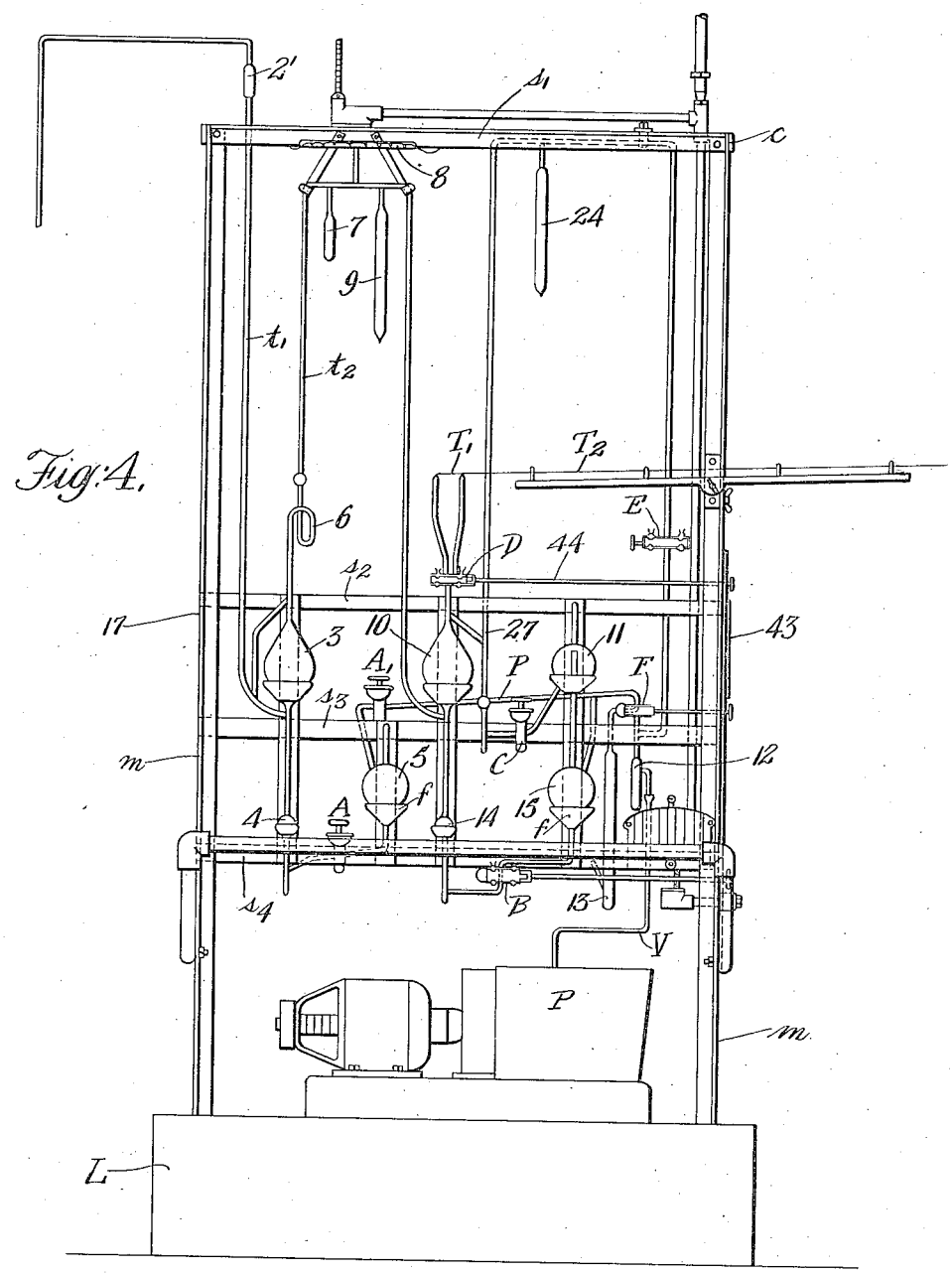

In the accompanying drawing illustrating the invention, Fig. 1 is a diagram of an emanation purifying and collecting system, Figs. 2 and 3 are diagrams illustrating modifications, and Fig. 4 is an elevational view of apparatus embodying the invention.

In the system shown the flask 1 contains the radium in the form of radium bromide or radium chloride dissolved in a dilute solution of hydrochloric acid, containing also other salts such as barium, calcium or sodium chloride, mainly for the purpose of lowering the vapor pressure of the solution to reduce the tendency of the water to distill over into other parts in the apparatus. In the conduit from the flask a system of traps 2 is provided for the purpose of safeguarding the radium against theft either by the introduction of a flexible tube through the conduit or by filling the radium flask and conduit with water, the flask itself being of course enclosed in a safe. The next trap 2' is for the purpose of preventing mercury from falling into the radium solution in case any break should occur in the adjoining apparatus.

Leading from this system of traps the tube $t_1$ passes down and is connected above and below mercury vessel or bulb 3 connected through the trap 6 to the purification systems comprising tube 7 for sodium hydroxide, tube 8 for a heated copper oxide coil, and tube 9 for phosphorus pentoxide to absorb carbon dioxide, hydrogen, moisture, etc. Each of said tubes is connected to branch off from the tube $t_2$ in the manner shown to facilitate removal and replacement. The copper coil of tube 8 may be heated by connection in an exterior electric circuit passing a current through the coil as shown, or this coil may be arranged as shown at 8' in dotted lines to form a closed circuit in the tube and have an exterior coil $c$ surrounding the tube 8' and carrying alternating currents to induce heating currents in the inner coil. In this latter arrangement a cup of conducting metal containing copper oxide may be substituted for the coil.

The system is kept under a very high vacuum for the emanation under atmospheric pressure would occupy only a very minute volume. The emanation left in communication with the purification system of tubes 7, 8 and 9, for a sufficient length of time, has abstracted from it substantially all impurities so that only the pure emanation gas and helium remain. When thus purified the emanation is passed on and finally collected and compressed in small glass tubes $T_1$, $T_2$ usually of capillary proportions.

The emanation accumulating in the radium flask 1 and tube $t_1$ during a given interval is passed on to the purification system by means of a variable mercury level controlled by bulb 3, trap 4, stop cock A, bulb 5, stop cock $A_1$ and pipe P and connecting tubing. With stop cocks A, $A_1$ open and the pipe P connected to exhaust through trap 12 to the vacuum pump connection V the mercury will flow from bulb 3 to bulb 5, the level of the mercury from bulb 3 being maintained just above trap 4 by closing stop cock A, if necessary and the emanation will diffuse into the bulb 3 from tube $t_1$. Upon turning the three-way stop cock F to shut off the connection of pipe P to the vacuum and connect it to the atmosphere through the calcium chloride drying container 13 pressure will be admitted to the surface of the mercury in bulb 5 and upon opening stop cock A this will press the mercury from bulb 5 up through bulb 3 trapping the emanation above it and pushing it up through trap 6 to the purification system between trap 6 and the bulb 10. This alternate filling and emptying of bulb 3 may be repeated if desired to practically exhaust the emanation from the flask 1 and the tube $t_1$.

To draw the emanation from the purification system and compress it in the capillary tubes a second variable mercury level system is used comprising bulb 10, trap 14, stop cocks B, C and D, bulb 15 and auxiliary bulb 11 and connecting tubing. The tube $t_5$ is connected to the vacuum pump connection V through the stop cock E and serves to exhaust the air from the capillary tubes preparatory to filling them with the emanation. With the stop cocks A, $A_1$, C, D and E closed and stop-cock B open and stop-cock F turned to connect pipe P to the vacuum pump mercury will flow from bulb 10 into the bulb 15 and reach a level just above trap 14 so as to permit the purified emanation to diffuse into bulb 10. Stop-cock F is then turned to connect pipe P to atmospheric pressure which upon opening stop-cock B will raise the level of the mercury in bulb 10 pressing the emanation up through the stop-cock D which has been previously opened to permit the emanation to enter capillary tube $T_1$ or $T_2$. Stop-cock D is designed to turn without grease lubricant and its mercury sealing grooves $v$ are ground and then polished to give an extended even contact between the mercury and glass and exclude the air. Stop-cock D is then closed and stop-cock F is turned to connect pipe P to the vacuum pump again lowering the level of the mercury in bulb 10 to trap 14 and permitting another increment of the purified emanation to diffuse into the bulb 10 and this collection of successive increments of the purified emanation is repeated as often as desired until the emanation is substantially exhausted from the purification system. When the full amount of emanation has been collected in tube $T_1$ or $T_2$ it is compressed therein by opening stop-cock C to permit the pressure from mercury bulb 11 to be added to the mercury pressure on the emanation in the capillary tube, bulb 11 being at a higher level than bulb 15 and therefore bringing a pressure more nearly atmospheric to bear on the emanation.

The emanation is thus collected in the capillary tube $T_1$ or $T_2$ under a pressure somewhat less than atmospheric and the portion of the tube with the emanation in it is thus fused off and may be divided into a number of shorter tubes by further fusing at intervals with the tiny flame. These short tubes containing the emanation are then applied to the parts to be treated. When the capillary tubes have been used up new capillary tubes are added by fusing them directly upon the tubes leading from the stop-cock D for instance at the point 25.

This method of collecting emanation is simple and exact in its operation and the apparatus does not subject the operator to prolonged exposure to injurious rays. For the transfer of the emanation from the radium flask to the purification system it is only necessary in practice to turn stop-cock A wide open and then manipulate stop-cock F to run the mercury in flask 3 up and down. Since the emanation decomposes organic substances such as grease, stop-cocks A, B and C are designed to work without grease. They have pyrex plugs and graphite or lead and graphite for a lubricant. It is essential that the mercury at the bottom of the frame be open to atmosphere, so that atmospheric pressure acting on the stopper does not force the latter down too much and make it turn with difficulty. To accomplish this purpose, either a side tube is attached to the frame of the stop-cock, so that atmospheric pressure can act on this mercury through this tube, or else, the stopper itself being hollow, by having one hole at the bottom and one hole in the handle, it brings the mercury at the lower seal in direct communication with the atmosphere.

These special stop-cocks work very well as long as there is no moisture between the ground surfaces. Since, however, the mercury in bulb 3 is always more or less wet, stop-cock A in time collects enough moisture to affect its satisfactory operation. To eliminate this trouble a heating coil 30 is placed under stop-cock A. This coil is heated by the same current which heats the copper coil, and serves two purposes, one, to warm the stop-cock slightly, and two, to help reduce the line voltage, which is ordinarily 110 volts, to that required by the copper coil, which is not over 30 volts. A similar coil 31 under stop-cock B is also used, inasmuch as it does not involve any waste of power if it is connected also in series with the copper coil. A rheostat 32 is also needed to control the current in the copper coil and heat the latter to the correct temperature. All of the stop-cocks utilizing mercury sealing grooves have these grooves highly polished so as to have as close and continuous a contact as possible with the mercury. The mercury and glass surfaces mutually tend to repel, and when the ground surface of the groove is left relatively rough as in prior practice there is very poor contact between the mercury and the surface of the glass so that leakage between the mercury and the glass is likely to occur. By polishing the mercury sealing grooves, this source of leakage is entirely prevented.

The stop-cock D may be turned to connect through tube $T_1$ or $T_2$ to the tube from bulb 10 so that two capillary tubes can be used at the same time and the emanation can be transferred from one tube to the other very easily without loss. This is especially important in the case where an active deposit is to be collected from the emanation. To do this a bulb 100 (dotted lines Fig. 1) is attached to one branch from the stop-cock and the emanation is compressed into the upper projection of this bulb which contains the salt for receiving the active deposit. The emanation is left there for three or four hours for the accumulation of this deposit and then the emanation by the lowering of the level of the mercury of bulb 10 is drawn out of the bulb 100, stop-cock D is turned to close the connection to the bulb and to open the connection to the capillary tube, the mercury level of bulb 100 raised to compress this emanation into the capillary tube, stop-cock D is again turned to close the connection to the capillary tube and open that to the bulb 100 and these operations are repeated until all of the emanation has been transferred from the bulb to the capillary tube and collected as usual. The active deposit is then collected by cutting off the bulb tube and dissolving the salt in the bulb in water. The tube joining the bulb 10 and the stop-cock D is straight and vertical so that there is no likelihood of trapping some of the emanation between the mercury and the glass tubing as will happen in case the tube was inclined and had pockets.

The purpose of the Y connection 27 to the stop-cock D is to make it possible to exhaust the capillary tubes by means of the vacuum pump and then raise the mercury into the U tube and disconnect this part of the system from the pump. Then the emanation can be collected in the capillary tube by manipulating stop-cock B. To compress the emanation into the capillary tube so that it occupies a small section of the capillary tube we can raise the mercury still farther by manipulating stop-cock C, bulb 11 being considerably higher than bulb 15. These two bulbs are connected in the way shown in order to eliminate the possibility of transferring too much mercury into bulb 11, and also for the sake of simplicity. With this arrangement the mercury in bulb 11 can never rise above the level of the inner tube, because it immediately overflows into the bulb 5. The connection to the vacuum pump for the two bulbs is made through one tube.

The tube 24 is coated inside with phosphorous pentoxide to keep the system from bulb 10 to the pump dry. Stop-cock E is a special stop-cock with mercury rings and internal seal so that it works without grease and still prevents any air from getting into the system. The stop-cock F is a three-way stop-cock which also works without grease, being especially designed for this purpose.

Tube 13 contains calcium chloride between two glass wool plugs, for the purpose of drying and filtering the air which is allowed into the bulbs 5 when the mercury is to be raised into bulbs 3 and 10. If a new capillary tube is sealed on to the apparatus the necessary blowing is done through this tube.

The connection to the vacuum pump is made through the trap 12, which is designed to catch any mercury that might come from the apparatus in case of accidents. If a General Electric two stage oil sealed vacuum pump is used, it is necessary after pumping to allow atmospheric air into 12 and the vacuum pump, to prevent the oil in the pump from rising into 12 and possibly filling bulbs 5. As this filling of bulbs 5 with oil is a very serious matter, it is desirable to have an arrangement which will make it impossible for this to happen, and stop-cock F is shown in a horizontal position, and has a disc 50 attached to it which covers the push button 51 of the electric switch which turns the motor of the vacuum pump off. In this disc there is a slot or opening which uncovers the push button when the stop-cock is in such a position that air goes into the pump. In other words, after having been started the pump cannot be shut off except when it is open to atmosphere.

This apparatus is quite convenient for the collection of emanation for ordinary purposes. The exposure of the technician operating the apparatus is not serious, because the actual manipulation does not require a long time and the emanation is mostly pretty far from the operator. It is to be remembered, also, that the beta and gamma ray activity is zero when the emanation is first passed into the apparatus, and reaches a maximum in about four hours, increasing rather rapidly at first. When, however, we want to collect the active deposit, there is a very strong source of radiation and exposure to this is dangerous in spite of the fact that the actual manipulation takes only a few minutes. For this reason the apparatus is designed to be controlled from a distance. The stop-cock B is operated by means of a connecting rod and universal joint or a flexible shaft 41 from a considerable distance, behind a lead plate 42 having a lead glass window 43. A similar connection 44 is used to operate stop-cock D from behind plate 42. Stop-cock C need not have a distant control attachment because it is only used once in the process of collecting the emanation, and at that time the operator has to be near the capillary tube to cut it off. Stop-cocks E and F are placed near the lead plate with connections therethrough so that they can be operated by hand from the protected position of the operator.

To avoid as far as possible the distillation over of water from the radium solution in flask 1 and the consequent uncertainty in the collection of the radium emanation bulb 3 may be heated while the mercury is in bulb 5 and in this way the water vapor is driven back into the radium flask. Cooling of the radium flask may also be used to prevent distillation over of moisture.

To overcome the difficulty presented by the distillation of water the solution in flask 1 may be of radium phosphate in an excess of concentrated phosphoric acid of sufficient fluidity to permit the emanation to escape readily or an amalgam of radium in mercury. The emanation from the phosphate still contains impurities, hydrogen and oxygen, but the emanation from the amalgam is pure except for traces of helium and there is no need of a purification system. With the amalgam it is also a simple matter to agitate or heat the amalgam to drive over the emanation, any mercury vapor evolved condensing and passing back to the flask and a cooling means may be employed if desired. The heating could be done by means of a transformer arrangement as described for the copper coil. The radium flask would be made of pyrex glass so as to stand the heating more effectively and would be connected to bulb 10 by means of a ground joint. The rest of the apparatus from 10 to the vacuum pump could remain the same. The radium amalgam would have to be kept always under vacuum, otherwise the radium would be oxidized if air came in contact with it. No air would ever come in contact with the amalgam except in case of accidents, and precautions could be taken to prevent as far as possible the occurrence of such accidents.

With radium as an amalgam in flask 21 (Fig. 2) the tube $t_1$ may be directly connected to the bulb 30 thus greatly simplifying the method and apparatus and in the remaining collection apparatus the operation is convenient and safe.

The mercury bulb 35 is connected to the bulb 30 through stop cock $B_2$ which in the form shown in Fig. 2 has a vertical axis and comprises a hollow plug portion 36 fitting in frame 37 with the mercury seal 37' in cup 38 closing out the atmosphere. The stop cock $B_2$ is controlled by a flexible cord 39 looped around the groove of a wheel 40 of the stop cock plug and this cord passes through a flexible tube 39' to a remote control behind the lead protective plate.

In the modification shown in Fig. 3 the emanation supply pipe $t_1$ opens into a bulb 50 surrounding a mercury dropper 51 receiving its supply of mercury from bulb 52 above. The mercury dropper 51 intermittently drops slugs of mercury in to the vertical tube 53 and between these slugs passing down the tube 53 successive increments of the emanation will be carried down into bulb 55 and accumulated therein. The dropped mercury received in bulb 55 may be returned to bulb 52 by any desired means and used over again.

The emanation purifying and collecting system of this invention involves the use of glass tubing and apparatus of extended vertical dimensions the uppermost portions as shown being considerably over 760 mm. above the lower portions. The lower variable level parts also must be raised from the floor in position for convenient inspection and manipulation thus increasing the total height. In the embodiment of the apparatus shown in Fig. 4 the purifying and collection apparatus is supported by a metal frame 17 having its uprights $m$ molded in the cement slab L. There are four uprights $m$ connected together at the ends by cross pieces $c$ and at the sides by horizontal supports $s_1, s_2, s_3, s_4$ to which are attached the holders for the flasks or bulbs 3, 5, 10, 15, etc. Each of these holders comprises a funnel shaped part $f$ containing plaster of Paris within which the flask or bulb is set before hardening so that the weight is distributed over a large area. The flasks or bulbs in turn support the glass tubing which is simply horizontally steadied by its connections to the frame M. Vibration and temperature changes will therefore not produce dangerous stresses between the parts of the extended apparatus but the whole is in effect flexibly floated in the plaster supports. The supporting structure itself is adapted to absorb and deaden vibration in that the cement slab L rests on the floor separating the floor and the metal framework M.

Duplicate purifying and collection systems are arranged on opposite sides of the frame M and both systems are supplied from the same source and connected to a single vacuum pump P mounted within the frame on the concrete slab L. One side may therefore be disconnected for replacements or repairs and the purification and collection proceeded with on the other side. The apparatus is compact and at the same time accessible in every part, altogether it forms a separate unit and may be moved as a whole with its supporting slab L without disturbing the component parts.

With the method and apparatus of this invention the radium emanation is kept continuously under high vacuum until finally collected in the capilliary tubes or as an active deposit. The emanation may first be applied to form a deposit and then have the residue collected without loss for further use. At no point in the process does the emanation come into contact with the air or any substance attacked by the emanation so all that remains is to remove the impurities incident to the evolution of the emanation and with the mercury amalgam as the source of emanation even these impurities are overcome. The apparatus is exact and quick in its operation requiring only short attention from the operator at extended intervals and affording safe protection against the injurious rays. When once installed there are no delicate parts to get out of adjustment and with proper care it will remain in operable condition for a long time.

I claim:—

1. In apparatus for collecting radium emanation, the combination with means for subjecting radium or one of its salts to a high vacuum, means for collecting the emanation evolved in this vacuum comprising a vacuum pump and a variable mercury level pump cooperating therewith, and means for compressing said emanation comprising a plurality of containers and means for compressing said emanation alternatively in either one of said containers while the other containers are closed off from the emanation supply.

2. In apparatus for collecting radium emanation, the combination with means for collecting the emanation under a vacuum, of means for compressing said emanation, a protective plate between the operator and the compressing means, and means for controlling said compressing means from behind said plate.

3. In apparatus for collecting radium emanation, the combination with means for collecting the radium emanation in a vacuum, of variable mercury level means for collecting and compressing said emanation, a protective plate facing said compressing means, and means for collecting said compressing means from behind said plate.

4. In radium emanation collection apparatus the combination with mercury bulbs and connecting tubes of supporting means for said apparatus through said bulbs comprising holders fitted to said bulbs, and a metal frame supporting said holders in proper spaced relation and comprising vertical uprights sunken in a cement base.

5. Radium emanation collection apparatus comprising a cement base, vertical metal rods cast in said base, horizontal cross pieces extending between said rods, holders supported from said cross pieces, mercury bulbs carried by said holders, and connecting tubing supported from said bulbs.

6. Radium emanation collection apparatus comprising a cement base, vertical metal rods cast in said base, horizontal cross pieces extending between said rods, holders supported from said cross pieces, mercury bulbs set in plaster in said holders, and connecting tubing supported from said bulbs.

7. A stop-cock comprising a frame and a plug with mercury sealing grooves between said frame and plug said grooves having polished glass surfaces to give extended even contact between the mercury and the glass.

GIOACCHINO FAILLA.